(12) United States Patent
Hwang et al.

(10) Patent No.: US 8,571,568 B2
(45) Date of Patent: Oct. 29, 2013

(54) COMMUNICATION SYSTEM USING MULTI-BAND SCHEDULING

(75) Inventors: Hyo Sun Hwang, Seoul (KR); Kyung Hun Jang, Suwon-si (KR); Youngsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 12/490,136

(22) Filed: Jun. 23, 2009

(65) Prior Publication Data

US 2010/0150113 A1 Jun. 17, 2010

(30) Foreign Application Priority Data

Dec. 17, 2008 (KR) .................. 10-2008-0128546

(51) Int. Cl.
*H04W 72/00* (2009.01)
(52) U.S. Cl.
USPC ...................... 455/452.2; 370/336
(58) Field of Classification Search
USPC .................. 455/452.1, 452.2, 454
See application file for complete search history.

(56) References Cited

U.S. PATENT DOCUMENTS

| | | | | |
|---|---|---|---|---|
| 5,890,112 A * | 3/1999 | Kitabatake | ..................... | 704/229 |
| 5,912,706 A * | 6/1999 | Kikuchi et al. | .......... | 375/240.13 |
| 6,067,118 A * | 5/2000 | Chen et al. | ................ | 375/240.03 |
| 6,134,523 A * | 10/2000 | Nakajima et al. | ............. | 704/229 |
| 6,229,854 B1 * | 5/2001 | Kikuchi et al. | .......... | 375/240.27 |
| 6,519,004 B1 * | 2/2003 | Bahl | .......................... | 348/385.1 |
| 6,680,976 B1 * | 1/2004 | Chen et al. | ............... | 375/240.26 |
| 6,691,086 B2 * | 2/2004 | Lokhoff et al. | ............... | 704/229 |
| 6,754,266 B2 * | 6/2004 | Bahl et al. | ................. | 375/240.01 |
| 6,832,198 B1 * | 12/2004 | Nguyen et al. | ................ | 704/500 |
| 6,915,255 B2 * | 7/2005 | Watanabe | .................. | 704/200.1 |
| 7,385,960 B2 * | 6/2008 | Bansal et al. | ................. | 370/338 |
| 7,397,785 B2 * | 7/2008 | Wu et al. | ....................... | 370/350 |
| 7,424,160 B1 * | 9/2008 | Basse | ............................. | 382/236 |
| 7,447,504 B2 * | 11/2008 | Lohr et al. | ..................... | 455/450 |
| 7,457,588 B2 * | 11/2008 | Love et al. | .................. | 455/67.11 |
| 7,490,342 B2 * | 2/2009 | Echigo et al. | .................... | 725/46 |
| 7,502,341 B2 * | 3/2009 | Matoba et al. | ................ | 370/319 |
| 7,545,771 B2 * | 6/2009 | Wentink et al. | ................ | 370/329 |
| 7,565,152 B2 * | 7/2009 | Gandhi et al. | ................ | 455/453 |
| 7,596,278 B2 * | 9/2009 | Basse | ............................ | 382/236 |
| 7,664,054 B2 * | 2/2010 | Adya et al. | ..................... | 370/255 |
| 7,689,186 B2 * | 3/2010 | Matoba et al. | ............. | 455/180.1 |
| 7,706,384 B2 * | 4/2010 | van Beek | ................... | 370/395.4 |
| 7,739,105 B2 * | 6/2010 | Zeng | ......................... | 704/200.1 |
| 7,826,850 B2 * | 11/2010 | Matoba et al. | ............... | 455/450 |
| 7,899,451 B2 * | 3/2011 | Hu et al. | .................... | 455/422.1 |

(Continued)

FOREIGN PATENT DOCUMENTS

KR 10-2006-0135572 12/2006
KR 10-2007-0075650 7/2007

(Continued)

*Primary Examiner* — Hai V Nguyen
(74) *Attorney, Agent, or Firm* — NSIP Law

(57) ABSTRACT

A multi-band scheduling method determines frequency bands for each of a plurality of frames existing in a single session queue from among a plurality of frequency bands based on data characteristics of each of the plurality of frames. In particular, the multi-band scheduling method may assign a frame with a high significance to a frequency band having a superior channel state, thereby increasing communication reliability. Also, a broadcasting service system may use the multi-band scheduling method to effectively provide the broadcasting services.

17 Claims, 6 Drawing Sheets

(56) References Cited

U.S. PATENT DOCUMENTS

| | | | |
|---|---|---|---|
| 7,904,018 B2 * | 3/2011 | Park et al. | 455/3.01 |
| 7,912,090 B2 * | 3/2011 | Yu et al. | 370/477 |
| 7,916,794 B2 * | 3/2011 | Li et al. | 375/240.26 |
| 7,936,818 B2 * | 5/2011 | Jayant et al. | 375/240.05 |
| 8,054,894 B2 * | 11/2011 | Xiao et al. | 375/260 |
| 8,116,486 B2 * | 2/2012 | Schnell et al. | 381/119 |
| 8,155,098 B2 * | 4/2012 | Huang et al. | 370/343 |
| 8,200,169 B2 * | 6/2012 | Fujii et al. | 455/92 |
| 8,259,644 B2 * | 9/2012 | Choi et al. | 370/321 |
| 8,265,657 B2 * | 9/2012 | Shao et al. | 455/456.2 |
| 8,433,328 B2 * | 4/2013 | Kawamura et al. | 455/450 |
| 8,488,531 B2 * | 7/2013 | Van De Beek et al. | 370/329 |
| 2001/0016008 A1 * | 8/2001 | Bahl et al. | 375/240.18 |
| 2002/0080267 A1 * | 6/2002 | Moluf | 348/385.1 |
| 2002/0116179 A1 * | 8/2002 | Watanabe | 704/200.1 |
| 2002/0126755 A1 * | 9/2002 | Li et al. | 375/240.12 |
| 2002/0136298 A1 * | 9/2002 | Anantharamu et al. | 375/240.12 |
| 2002/0154211 A1 * | 10/2002 | Takaki et al. | 348/14.08 |
| 2002/0169601 A1 * | 11/2002 | Nishio | 704/205 |
| 2003/0133500 A1 * | 7/2003 | Auwera et al. | 375/240.11 |
| 2003/0138043 A1 * | 7/2003 | Hannuksela | 375/240.08 |
| 2003/0217091 A1 * | 11/2003 | Echigo et al. | 709/103 |
| 2004/0072579 A1 * | 4/2004 | Hottinen | 455/456.1 |
| 2004/0100586 A1 * | 5/2004 | Li et al. | 348/584 |
| 2004/0143443 A1 * | 7/2004 | Kudumakis et al. | 704/500 |
| 2004/0154041 A1 * | 8/2004 | Zhang | 725/74 |
| 2004/0185783 A1 * | 9/2004 | Okawa et al. | 455/63.4 |
| 2004/0254785 A1 * | 12/2004 | Zeng | 704/200.1 |
| 2005/0037743 A1 * | 2/2005 | Takaki et al. | 455/414.1 |
| 2005/0135480 A1 * | 6/2005 | Li et al. | 375/240.12 |
| 2005/0140674 A1 * | 6/2005 | Li et al. | 345/428 |
| 2005/0157737 A1 * | 7/2005 | Rabie et al. | 370/416 |
| 2005/0285803 A1 * | 12/2005 | Iacono et al. | 343/702 |
| 2006/0085828 A1 * | 4/2006 | Dureau et al. | 725/100 |
| 2006/0099907 A1 * | 5/2006 | Park et al. | 455/3.02 |
| 2006/0146138 A1 * | 7/2006 | Xin et al. | 348/207.99 |
| 2006/0146141 A1 * | 7/2006 | Xin et al. | 348/211.7 |
| 2006/0146143 A1 * | 7/2006 | Xin et al. | 348/218.1 |
| 2006/0156009 A1 * | 7/2006 | Shin et al. | 713/176 |
| 2006/0160551 A1 * | 7/2006 | Matoba et al. | 455/509 |
| 2006/0215603 A1 * | 9/2006 | Nishio et al. | 370/329 |
| 2006/0215628 A1 * | 9/2006 | Olariu et al. | 370/348 |
| 2006/0282737 A1 * | 12/2006 | Shi et al. | 714/746 |
| 2006/0291560 A1 * | 12/2006 | Penna et al. | 375/240.16 |
| 2007/0030356 A1 * | 2/2007 | Yea et al. | 348/207.99 |
| 2007/0054680 A1 * | 3/2007 | Mo et al. | 455/502 |
| 2007/0058595 A1 * | 3/2007 | Classon et al. | 370/337 |
| 2007/0064669 A1 * | 3/2007 | Classon et al. | 370/347 |
| 2007/0098098 A1 * | 5/2007 | Xiao et al. | 375/260 |
| 2007/0099668 A1 * | 5/2007 | Sadri et al. | 455/562.1 |
| 2007/0109409 A1 * | 5/2007 | Yea et al. | 348/153 |
| 2007/0121722 A1 * | 5/2007 | Martinian et al. | 375/240.12 |
| 2007/0156924 A1 * | 7/2007 | Ramalingam et al. | 709/246 |
| 2007/0183368 A1 * | 8/2007 | Stavinov | 370/332 |
| 2007/0189298 A1 * | 8/2007 | Wong et al. | 370/395.1 |
| 2007/0230428 A1 * | 10/2007 | Seki et al. | 370/341 |
| 2007/0232244 A1 * | 10/2007 | Mo et al. | 455/91 |
| 2007/0234395 A1 * | 10/2007 | Dureau et al. | 725/135 |
| 2007/0271480 A1 * | 11/2007 | Oh et al. | 714/3 |
| 2008/0055487 A1 * | 3/2008 | Chang | 348/726 |
| 2008/0085718 A1 * | 4/2008 | Kuchibhotla et al. | 455/452.1 |
| 2008/0090581 A1 * | 4/2008 | Hu | 455/452.1 |
| 2008/0170551 A1 * | 7/2008 | Zaks | 370/338 |
| 2008/0170552 A1 * | 7/2008 | Zaks | 370/338 |
| 2008/0196077 A1 * | 8/2008 | Basse | 725/116 |
| 2008/0259799 A1 * | 10/2008 | van Beek | 370/235 |
| 2008/0320354 A1 * | 12/2008 | Doppler et al. | 714/748 |
| 2009/0025081 A1 * | 1/2009 | Quigley et al. | 726/21 |
| 2009/0049188 A1 * | 2/2009 | Suneya et al. | 709/231 |
| 2009/0073942 A1 * | 3/2009 | Qin et al. | 370/338 |
| 2009/0082031 A1 * | 3/2009 | Kim et al. | 455/452.1 |
| 2009/0110065 A1 * | 4/2009 | Li et al. | 375/240.08 |
| 2009/0122884 A1 * | 5/2009 | Vook et al. | 375/260 |
| 2009/0129401 A1 * | 5/2009 | Kang et al. | 370/431 |
| 2009/0157897 A1 * | 6/2009 | Echigo et al. | 709/232 |
| 2009/0160865 A1 * | 6/2009 | Grossman | 345/502 |
| 2009/0226010 A1 * | 9/2009 | Schnell et al. | 381/119 |
| 2009/0274204 A1 * | 11/2009 | Chen et al. | 375/228 |
| 2009/0274224 A1 * | 11/2009 | Harris | 375/260 |
| 2009/0280749 A1 * | 11/2009 | Tanno et al. | 455/67.13 |
| 2009/0284650 A1 * | 11/2009 | Yu et al. | 348/390.1 |
| 2009/0320084 A1 * | 12/2009 | Azam et al. | 725/120 |
| 2010/0002692 A1 * | 1/2010 | Bims | 370/389 |
| 2010/0008338 A1 * | 1/2010 | Tsfati et al. | 370/338 |
| 2010/0020684 A1 * | 1/2010 | Balakrishnan et al. | 370/230 |
| 2010/0063803 A1 * | 3/2010 | Gao | 704/205 |
| 2010/0067464 A1 * | 3/2010 | Higuchi | 370/329 |
| 2010/0074190 A1 * | 3/2010 | Cordeiro et al. | 370/329 |
| 2010/0081442 A1 * | 4/2010 | Kronestedt et al. | 455/450 |
| 2010/0165932 A1 * | 7/2010 | Wan et al. | 370/329 |
| 2010/0215077 A1 * | 8/2010 | Balakrishnan et al. | 375/140 |
| 2010/0302985 A1 * | 12/2010 | Poola et al. | 370/312 |
| 2010/0322311 A1 * | 12/2010 | Vetro et al. | 375/240.12 |
| 2011/0075651 A1 * | 3/2011 | Jia et al. | 370/344 |
| 2011/0292996 A1 * | 12/2011 | Jayant et al. | 375/240.03 |
| 2012/0062756 A1 * | 3/2012 | Tian et al. | 348/218.1 |

FOREIGN PATENT DOCUMENTS

| | | |
|---|---|---|
| KR | 10-2007-0080389 | 8/2007 |
| KR | 10-2007-0099028 | 10/2007 |
| WO | WO 2007-024932 | 3/2007 |

* cited by examiner

COMMUNICATION SYSTEM USING MULTI-BAND SCHEDULING

CROSS-REFERENCE TO RELATED APPLICATION

This application claims the benefit under 35 U.S.C. §119(a) of Korean Patent Application No. 10-2008-0128546, filed on Dec. 17, 2008, the entire disclosure of which is incorporated herein by reference for all purposes.

BACKGROUND

1. Field

The following description relates to a communication system using multiple bands, and more particularly, to a technique for increasing efficiency of radio resources by assigning a plurality of frames to the multiple bands.

2. Description of Related Art

Because of limited frequency resources, studies for a technique of aggregating different frequency fragments such as a technique of utilizing a white space being unused by other communication systems using a cognitive radio technique, and the like have been actively made.

Also, a cellular based-communication system that performs a communication using multiple bands in an Institute of Electrical and Electronics Engineers (IEEE) 802.16m standard, and a Third Generation Partnership Project Long Term Evolution (3GPP-LTE) standard has been attempted, and there is interest in a communication system using the multiple bands.

It is assumed that an A frequency band and a B frequency band are available frequency bands. It may be inefficient to randomly allocate all frames to the A frequency band or the B frequency band, because quality of services (QoSs) required by each of the frames may be different from each other, and an allowable delay of each of the frames may be different from each other. In addition, since a channel state may differ in each of the A frequency band and B frequency band, which frame is allocated to which frequency band may greatly affect reliability of communication services.

SUMMARY

In one general aspect, a multi-band scheduling method includes designating at least two frequency bands; predicting at least one user's channel state at each of the at least two frequency bands; and determining a frequency band for each of a plurality of frames existing in each of at least one session queue from among the at least two frequency bands based on the at least one user's channel state at each of the at least two frequency bands and data characteristics of each of the plurality of frames.

Implementations may include one or more of the following features. For example, the frequency band may be determined by determining the frequency band for each of the plurality of frames based on a significance of each of the plurality of frames.

The frequency band may be determined for each of the plurality of frames to enable at least two frames of the plurality of frames of a single session queue to be assigned to different frequency bands.

A time slot in which each of the plurality of frames is transmitted may be determined.

When the plurality of frames include a first frame and a second frame, the at least two frequency bands may include a first frequency band and a second frequency band, a significance of the first frame may be higher than that of the second frame, and when a channel state in the first frequency band is superior to that in the second frequency band, the first frequency band may be determined as a band for the first frame, and the second frequency band may be determined as a band for the second frame.

The at least two frequency bands may be designated by designating the at least two frequency bands from frequency resources assigned for another communication system using a cognitive radio technique.

Any one of the at least two frequency bands may be determined as a band for the plurality of frames.

The frequency band may be determined for each of the plurality of frames based on at least one of required quality of service (QOS) of the plurality of frames, delay of the plurality of frames, and an amount of traffic of the plurality of frames.

The frequency band for each of the plurality of frames may be determined based on types of the plurality of frames.

At least two frames of the plurality of frames of a single session queue may be allocated to distinct frequency bands based on the determination.

In another general aspect, at least two frequency bands are designated for broadcasting services; and a frequency band for each of a plurality of frames included in a broadcasting data stream is determined from among the at least two frequency bands based on characteristics of each of the plurality of frames.

Implementations may include one or more of the following features. For example, at least two frames of the plurality of frames of a single broadcasting data stream may be allocated to distinct frequency bands based on the determination.

The plurality of frames may include a first frame having a high significance and a second frame having a significance lower than that of the first frame, and the first frame may be assigned to a low frequency band and the second frame to a high frequency band, respectively. The first frame may be an Infra frame, and the second frame may be a Previous frame or a Bidirectional frame.

User characteristics information associated with at least one of a user's mobility and a user's location may be provided. The frequency band for each of the plurality of frames may be determined based on the user characteristics information.

The frequency band for each of the plurality of frames may be determined based on a significance of each of the plurality of frames.

In another general aspect, a scheduling result information is received from a scheduler; a frequency band for each of a plurality of frames included in a broadcasting data stream is ascertained based on the scheduling result information from the scheduler; and a plurality of frames received from a transmitter is decoded using an ascertained result. The scheduler determines a frequency band for each of the plurality of frames from among the at least two frequency bands based on characteristics of each of the plurality of frames included in the broadcasting data stream.

Implementations may include one or more of the following features. When the plurality of frames include a first frame having a high significance and a second frame having a significance lower than that of the first frame, and when the scheduler respectively assigns the first frame to a low frequency band and the second frame to a high frequency band, a frequency band for the first frame may be ascertained to be the low frequency band and a frequency band for the second frame may be ascertained to be the high frequency band based on the scheduling result information.

At least one computer-readable storage medium includes computer readable instructions causing a computer to designate at least two frequency bands; predict at least one user's channel state at each of the at least two frequency bands; and determine a frequency band for each of a plurality of frames existing in each of at least one session queue from among the at least two frequency bands based on the at least one user's channel state at each of the at least two frequency bands and data characteristics of each of the plurality of frames.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements and structures. The relative size and depiction of these elements may be exaggerated for clarity, illustration, and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, descriptions of well-known functions and constructions may be omitted for increased clarity and conciseness.

Figure 1:
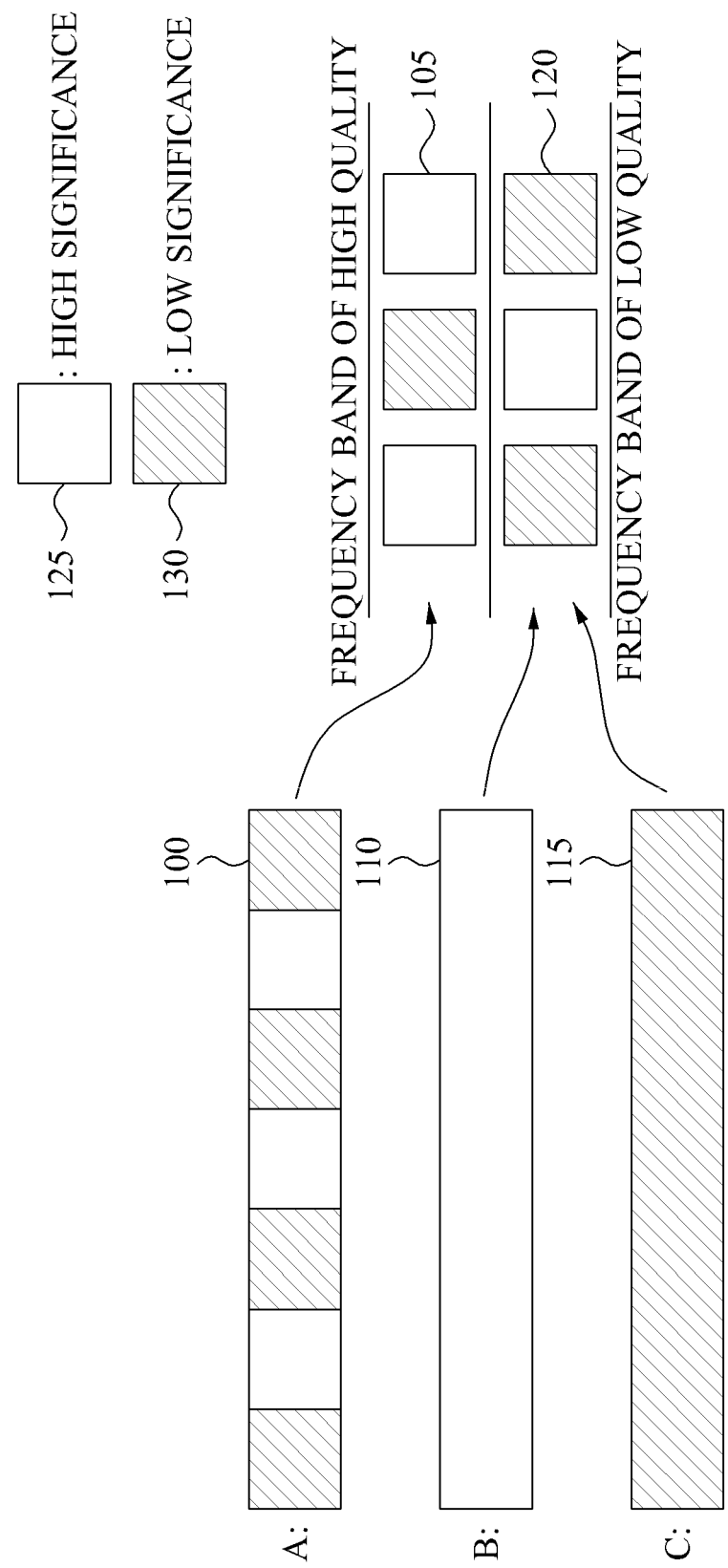
FIG. 1 is an illustration of an example of how frames in each session queues are allocated to each frequency band based on each quality of service of each of the session queues.

FIG. 1 illustrates an example of how frames in each session queues are allocated to each frequency band based on each quality of service of each of the session queues.

Referring to FIG. 1, a Media Access Control (MAC) processor may allocate frequency resources for a plurality of session queues A, B, and C. As used herein, the word "session" when used alone refers to a "session queue."

The MAC processor may allocate the session queues A, B, C to a corresponding frequency band based on a required quality of service (QOS) of each of the session queues A, B, C. For example, when a required QOS of the A session queue is highest, the MAC processor may allocate frames 100 existing in the A session queue to a high-quality frequency band 105. Conversely, when required QOS of the session queues B and C are relatively lower, the MAC processor may allocate frames 110, 115, respectively, existing in the session queues B and C to a relatively lower-quality frequency band 120.

However, frames existing in a single session queue may have different characteristics. For example, the frames existing in a single session queue may have different required QOSs, and significances of the frames may differ as shown in the session queue A in which significances of the frames 100 differ between high significance 125 and low significance 130. Therefore, allocating an entire session queue (such as A, B, or C) to a frequency band (such as bands 105 or 120) may fail to maximize or increase frequency efficiency.

As described below, a multi-band scheduling method may allocate frames having different qualities within a single session queue to different frequency bands based on data characteristics of the frames existing in the single session queue, thereby improving communication reliability and frequency efficiency.

Figure 2:
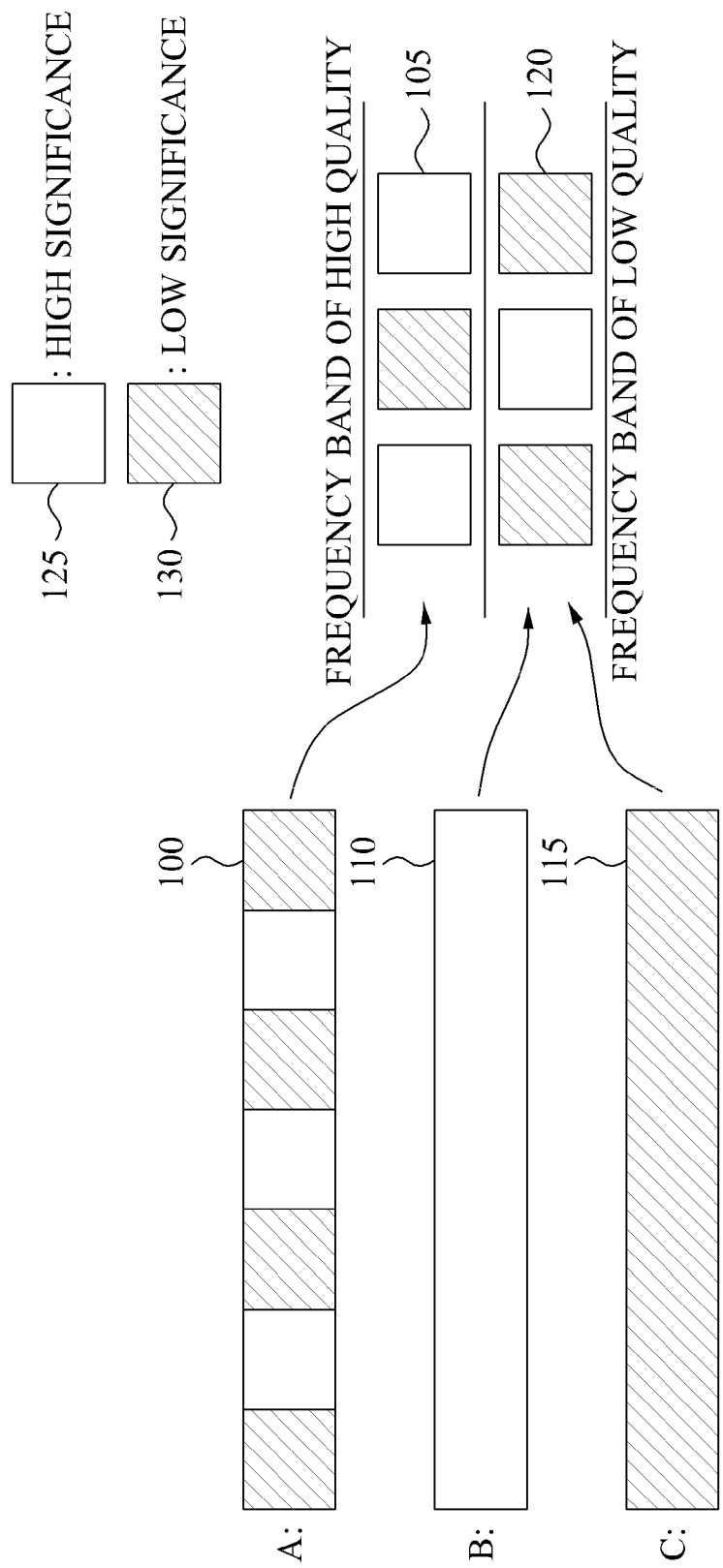
FIG. 2 is an illustration of an example of how frames in each session queues are distributed and allocated to frequency bands based on data significance of each of the frames.

FIG. 2 illustrates an example of how frames in each session queues are distributed and allocated to frequency bands based on data significance of each of the frames.

Referring to FIG. 2, the session queue A may include frames with a high significance 125 and frames with a low significance 130. Specifically, the frames existing in the session queue A may have various data characteristics.

In this case, the multi-band scheduling method may extract only frames with the high significance 125 from among the frames 100 existing in the session queue A, and allocate the extracted frames to the high-quality frequency band 105. Conversely, the frames with the low significance 130 from among the frames 100 existing in the session queue A may be allocated to the low-quality frequency band 120. Specifically, frames existing in the same session queue (for example, session queue A) may be allocated to different frequency bands 125 or 130 depending on their data characteristics.

The high-quality frequency band 105 may designate a frequency band having a high Signal to Noise Ratio (SNR) or a low Bit Error Rate (BER). In general, a low frequency band may be of high quality, and a high frequency band may be of low quality or vice versa.

Also, for example, all frames 110 existing in the session queue B may be allocated to the high-quality frequency band 105 due to their high significances, and all frames 115 existing in the session queue C may be allocated to the low-quality frequency band 120 due to their low significances.

Consequently, the multi-band scheduling method may perform a scheduling based on data characteristics of each of the frames existing in each of the session queues, as opposed to being based on only characteristics of the session queues as a whole. Particularly, the multi-band scheduling method may determine frequency bands for each of the frames within each session queue to enable a user to better receive frames with high significances than frames with low significances, thereby increasing reliability of communication services or broadcasting services, and satisfying required QOS of the user.

Figure 3:
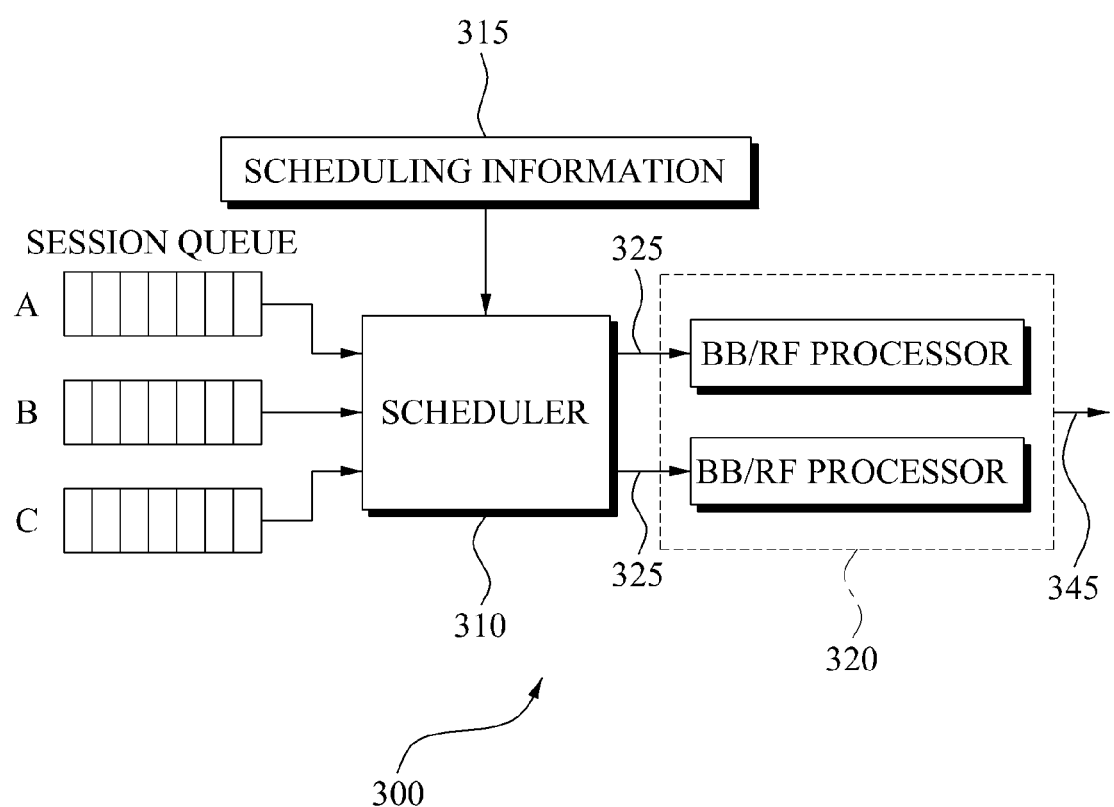
FIG. 3 is a block diagram of an exemplary transmitter including a scheduler.

FIG. 3 illustrates an exemplary transmitter 300 including a scheduler 310.

Referring to FIG. 3, the transmitter 300 includes the scheduler 310 that receives the frames of the session queues A, B, C and performs a scheduling with respect to the frames existing in each of the session queues A, B, C based on scheduling information 315.

The scheduling information 315 may include session information, channel state information in a frequency band, queue information, or user characteristics information. The session information may be information about data characteristics of frames, may include information about traffic characteristics of the session and application characteristics, and the channel state information may include information about the SNR or BER. Also, the queue information may include information about queue delay, and/or information about overflow or underflow associated with an amount of traffic. The user characteristics information may include information about a location and moving speed of a user, information about an amount of power remaining in a battery, and the like.

The scheduler 310 may determine frequency bands for a plurality of frames existing in each of the session queues based on the scheduling information. For example, when both frames with a high significance and frames with a low significance exist in a single session queue (such as session queue A), the scheduler 310 may allocate the frames with high significance 125 to the high-quality frequency band 105, and also allocate the frames with low significance 130 to the low-quality frequency band 120. That is, the scheduler 310 may allocate the frames with high significance to a frequency band with a superior channel state.

Additionally, the scheduler 310 may allocate available frequency bands to each of users. Also, when each of the users needs to use a single frequency band, the scheduler 310 may allocate a single frequency band to each of the users. Conversely, when each of the users needs to use at least two frequency bands, the scheduler 310 may distribute frames based on data characteristics of frames existing in each of the session queues, and allocate the distributed frames to the at least two frequency bands.

Also, the scheduler 310 may determine a time slot in which each of the frames is transmitted.

Scheduling result information 325 output by the scheduler 310 is provided to one or more BaseBand (BB)/Radio Frequency (RF) processors 320. In this case, each of the BB/RF processors 320 generates RF signals 345 in which contents of frames are reflected in at least two frequency bands corresponding to the scheduling result information of the scheduler 310. Specifically, the frequency bands corresponding to the scheduling result information 325 may be selected in a process where the frames are processed at a baseband.

Figure 4:
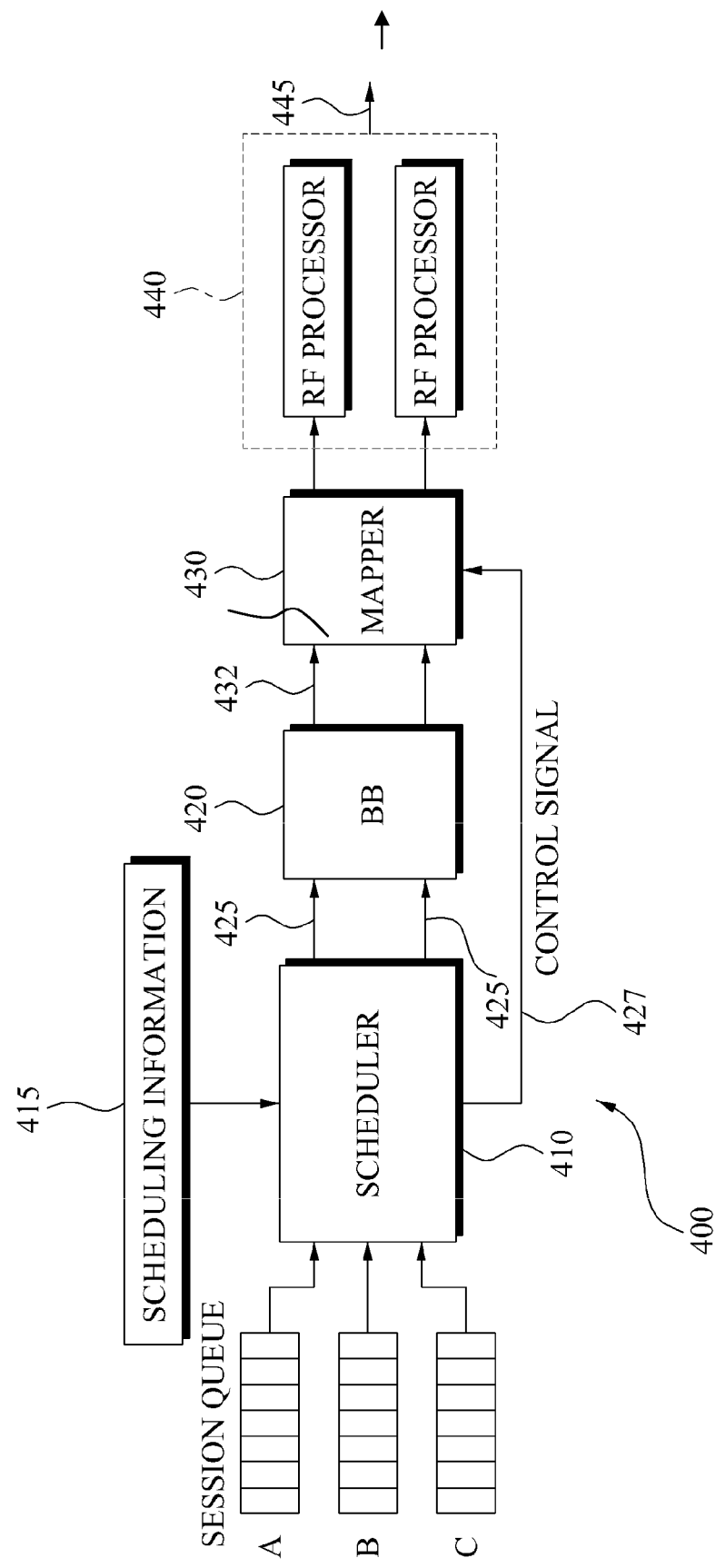
FIG. 4 is a block diagram of an exemplary transmitter including a scheduler.

FIG. 4 illustrates an exemplary transmitter 400 including a scheduler 410.

Referring to FIG. 4, the transmitter 400 includes the scheduler 410 that receives frames of the session queues A, B, C, and performs scheduling with respect to the frames existing in each of the session queues A, B, C based on scheduling information 415. The scheduler 410 determines bands for frames existing in each of the session queues based on the scheduling information 415. In particular, the scheduler 410 ascertains data characteristics of the frames existing in each of the session queues A, B, C based on the scheduling information 415, and determines frequency bands for the frames based on data characteristics of the frames. Also, scheduling result information 425 of the scheduler 410 may act as a control signal 427 that may be provided to a mapper 430.

Also, a BB processor 420 receives the scheduling result information 425 and processes frames at a baseband, and sends the processed frames 432 to the mapper 430. The mapper 430 may allocate the frames 432 from the BB to corresponding frequency bands using the control signal 427. Unlike the transmitter 300 of FIG. 3, the transmitter 400 of FIG. 4 may select frequency bands corresponding to the scheduling result information 425 after the frames are processed in the BB processor 420. Also, the frames in the corresponding frequency bands may be provided to RF processors 440, and the RF processors 440 may finally generate an RF signal 445.

Figure 5:
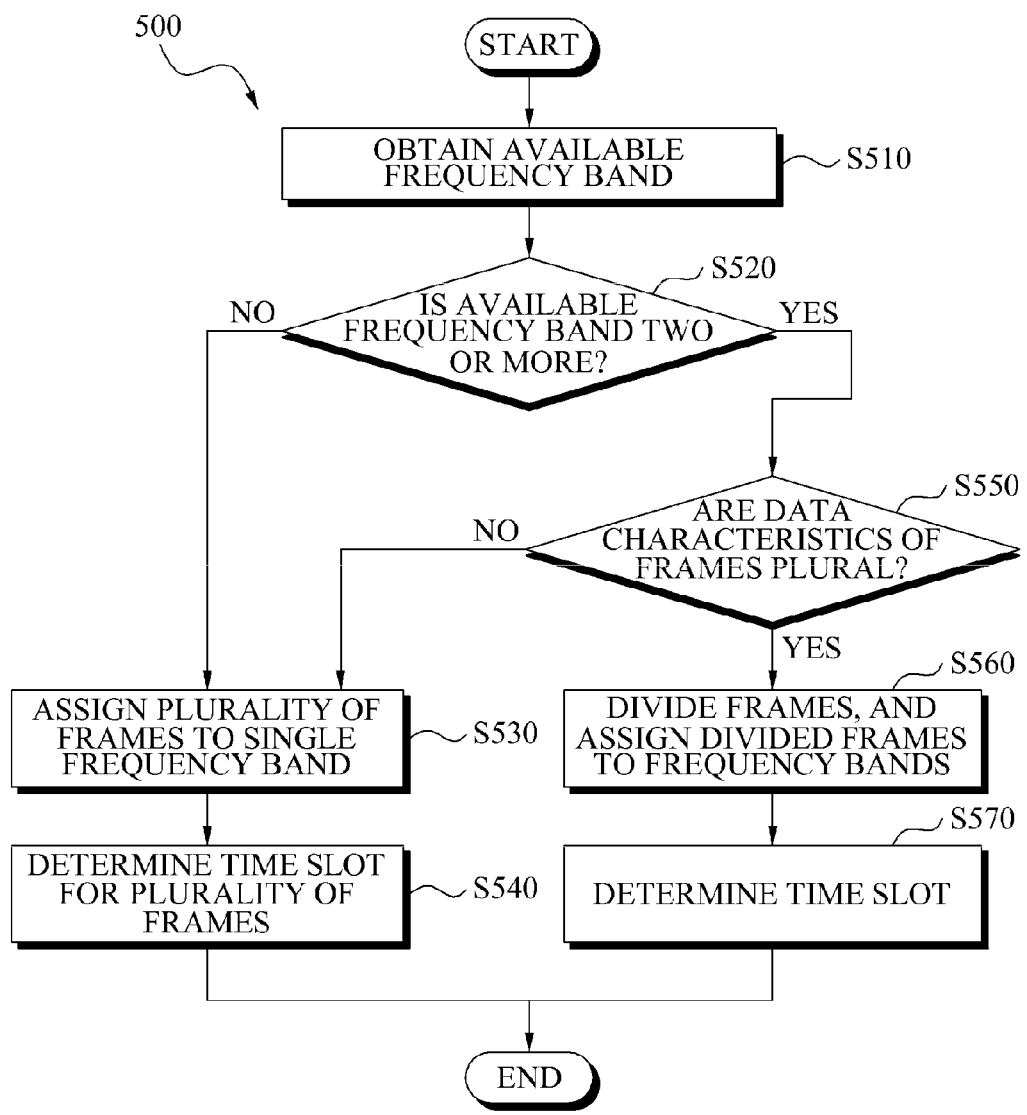
FIG. 5 is a flowchart of an exemplary procedure of a multi-band scheduling.

FIG. 5 illustrates a flowchart of an exemplary procedure 500 of a multi-band scheduling.

Referring to FIG. 5, the procedure 500 may be performed by, for example, the scheduler 300 or 400 for multi-band scheduling. At operation S510, available frequency bands are designated. The available frequency bands may be designated from frequency bands that are assigned to another communication system using a cognitive radio technique.

At operation S520, the multi-band scheduling procedure 500 ascertains whether a number of the available and designated frequency bands is more than two.

If it is determined at operation S520 that the number of the available frequency bands is one, then frames existing in each of the session queues are assigned to a single frequency band. Next, time slots in which a plurality of frames is transmitted are determined at operation S540.

If it is determined at operation S520 that the number of available and designated frequency bands is more than two, then it is determined whether the frames within a single session queue have various data characteristics (operation S550).

If the frames within a single session queue have a single data characteristic (operation S550), then the frames are assigned to any one of the allocated available frequency bands in operation S530.

If the frames within a single session queue have at least two data characteristics (operation S550), then the frames are appropriately separated or divided and the separated frames are assigned to frequency bands based on data characteristics of the frames, so that required QOSs may be satisfied (operation S560). Next, the time slots in which the frames are transmitted are determined (operation S570).

Figure 6:
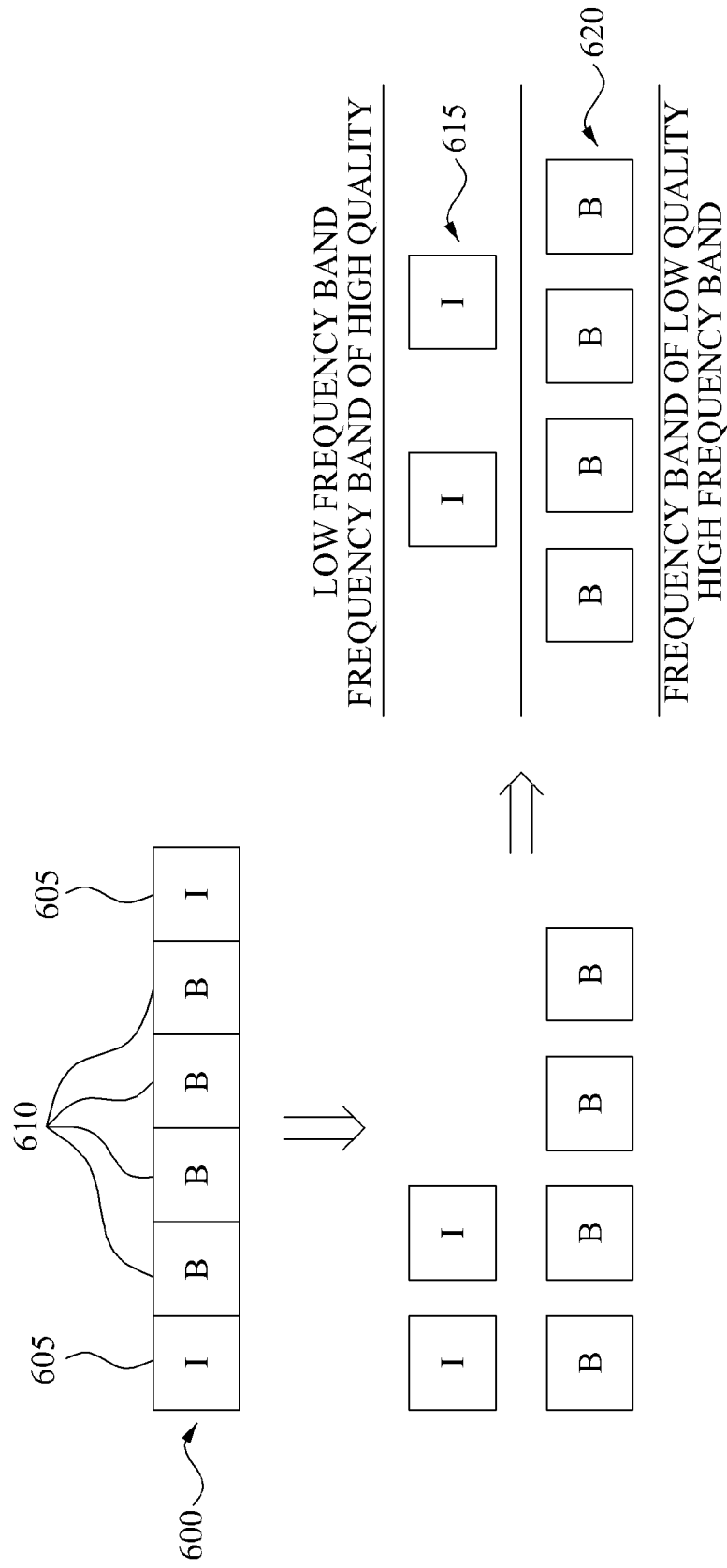
FIG. 6 is an exemplary illustration of a multi-band scheduling method applied to a communication system for broadcasting services.

FIG. 6 illustrates a multi-band scheduling method applied to a communication system for broadcasting services.

Referring to FIG. 6, the multi-band scheduling procedure 500 is applied to a communication system for broadcasting services. The multi-band scheduling procedure 500 may be well-suited in the communication system for broadcasting services. The communication system for broadcasting services may lack a feedback channel. In this case, a general transmitter (such as transmitter 300 or 400) may transmit frames at a low data rate so as to ensure communication reliability, which may be a cause of reducing frequency efficiency.

A broadcasting data stream 600 may be multimedia data as illustrated in FIG. 6, and may be assumed to include at least two different types of frames, such as Infra frames 605 and Bidirectional frames 610 of Moving Picture Experts Group (MPEG)-2. Previous frames are not illustrated in FIG. 6.

In the communication system for broadcasting services, the transmitter may determine frequency bands for frames depending on a type of the frames. For example, the transmitter may transmit the Infra frames 605 having a high significance through a low frequency band with a high quality 615, and transmit the Previous frames or Bidirectional frames 610 each having a low significance through a high frequency band with a low quality 620.

In particular, the transmitter may select the frequency bands for frames depending on the significances of the frames, thereby increasing frequency efficiency while not reducing a data rate beyond more than is needed. Also, the transmitter may determine the frequency bands for each of the frames based on user characteristics information concerning a mobility and location of a user, or optimize or improve an applicable data rate or modulation scheme.

In this case, all users included in the communication system may accurately receive the Infra frames 605 with a relatively high significance through the low frequency band with the high quality 615, thereby increasing communication reliability. In addition, users having a superior channel state even in the high frequency band may receive the Previous frames or Bidirectional frames 610 as well as the Infra frames 605, thereby increasing service quality. Also, a user, that is, a receiver or decoder included in the communication system, may receive scheduling result information from the scheduler (for example scheduler 310 or 410). Also, the receiver or decoder may ascertain frequency bands for each of the frames of the broadcasting data stream based on the scheduling result information. For example, the receiver or decoder may ascertain that the Infra frames 605 are assigned to a given frequency band, or the Previous frames or Bidirectional frames 610 are assigned to a given frequency band. The receiver or decoder may process frames received in an appropriate frequency band based on an ascertained result, and decode the processed frames.

As described above, the multi-band scheduling procedure may distribute frames from a single session queue based on data characteristics of each of the frames, and assign the distributed frames to different frequency bands, thereby more effectively using limited frequency resources.

The multi-band scheduling method may assign frequency resources based on data characteristics of each of frames existing in each of session queues as well as QOS of each of the session queues.

The methods described above may be recorded, stored, or fixed in one or more computer-readable storage media that includes program instructions to be implemented by a computer to cause a processor to execute or perform the program instructions. The storage media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-band scheduling method, comprising:
    designating at least two frequency bands;
    predicting at least one user's channel state at each of the at least two frequency bands; and
    scheduling each frame from a plurality of frames included in a single session queue to the at least two designated frequency bands, based on the at least one user's channel state at the at least two frequency bands and based on whether a frame comprises an infra frame (I-frame), a previous frame (P-frame), or a bidirectional frame (B-frame),
    wherein the scheduling is performed for a plurality of session queues, multiple frames in each session queue comprise different quality of service (QoS) requirements, and the multiple frames in each session queue are individually designated to the at least two frequency bands based on a quality of service requirement determined for each individual frame and based on differing qualities of the at least two frequency bands.

2. The multi-band scheduling method of claim 1, wherein the scheduling determines a frequency band for each frame to enable at least two frames of the plurality of frames included in the single session queue to be assigned to different frequency bands.

3. The multi-band scheduling method of claim 1, further comprising:
    determining a time slot in which each of the plurality of frames is transmitted.

4. The multi-band scheduling method of claim 1, wherein, when the plurality of frames include a first frame and a second frame, the at least two frequency bands include a first frequency band and a second frequency band, a significance of the first frame is higher than that of the second frame, and when a channel state in the first frequency band is superior to that in the second frequency band, the determining determines the first frequency band as a band for the first frame, and also determines the second frequency band as a band for the second frame.

5. The multi-band scheduling method of claim 1, wherein the designating designates the at least two frequency bands from frequency resources assigned for another communication system using a cognitive radio technique.

6. The multi-band scheduling method of claim 1, further comprising:
    determining any one of the at least two frequency bands as a band for the plurality of frames.

7. The multi-band scheduling method of claim 1, wherein the scheduling determines a frequency band for each frame based on at least one of required quality of service (QOS) of the plurality of frames, delay of the plurality of frames, and an amount of traffic of the plurality of frames.

8. The multi-band scheduling method of claim 1, further comprising allocating at least two frames of the plurality of frames of the single session queue to distinct frequency bands based on the determination.

9. The multi-band scheduling method of claim 1, wherein the scheduling comprises scheduling at least one of a P-frame and a B-frame from the single session queue to a first frequency band, and scheduling an I-frame from the single session queue to a second frequency band having a higher quality than the first frequency band.

10. A multi-band scheduling method for broadcasting services, comprising:
    designating at least two frequency bands for broadcasting services; and
    scheduling a frequency band for each frame from a plurality of frames included in a single broadcasting data stream queue from among the at least two frequency bands based on whether the frame comprises an infra frame (I-frame), a previous frame (P-frame), or a bidirectional frame (B-frame),
    wherein the scheduling is performed for a plurality of session queues, multiple frames in each session queue comprise different quality of service (QoS) requirements, and the multiple frames in each session queue are individually designated to the at least two frequency bands based on a quality of service requirement determined for each individual frame and based on differing qualities of the at least two frequency bands.

11. The multi-band scheduling method of claim 10, further comprising allocating at least two frames of the plurality of frames of the single broadcasting data stream to distinct frequency bands based on the determination.

12. The multi-band scheduling method of claim 10, wherein the plurality of frames include a first frame having a high significance and a second frame having a significance lower than that of the first frame, and the scheduling assigns the first frame to a low frequency band and the second frame to a high frequency band, respectively.

13. The multi-band scheduling method of claim 10, further comprising:
providing user characteristics information associated with at least one of a user's mobility and a user's location,
wherein the scheduling determines a frequency band for each of the plurality of frames based on the user characteristics information.

14. The multi-band scheduling method of claim 10, wherein the scheduling determines a frequency band for each of the plurality of frames based on a significance of each of the plurality of frames.

15. A method of receiving broadcasting services using multiple frequency bands, the method comprising:
receiving scheduling result information from a scheduler;
scheduling a frequency band for each frame from a plurality of frames included in a single broadcasting data stream queue based on the scheduling result information from the scheduler; and
decoding a plurality of frames received from a transmitter using an ascertained result,
wherein the scheduling result information is based on whether a frame comprises an infra frame (I-frame), a previous frame (P-frame), or a bidirectional frame (B-frame), and
the scheduling is performed for a plurality of session queues, multiple frames in each session queue comprise different quality of service (QoS) requirements, and the multiple frames in each session queue are individually designated to the at least two frequency bands based on a quality of service requirement determined for each individual frame and based on differing qualities of the at least two frequency bands.

16. The method of claim 15, wherein, when the plurality of frames include a first frame having a high significance and a second frame having a significance lower than that of the first frame, and when the scheduler respectively assigns the first frame to a low frequency band and the second frame to a high frequency band, the scheduling schedules a frequency band for the first frame as the low frequency band and a frequency band for the second frame as the high frequency band based on the scheduling result information.

17. A non-transitory computer-readable storage medium comprising computer readable instructions causing a computer to implement the method of claim 1.

* * * * *